(12) United States Patent
Croxford et al.

(10) Patent No.: US 7,822,926 B2
(45) Date of Patent: Oct. 26, 2010

(54) CACHE MEMORY

(75) Inventors: Daren Croxford, Burwell (GB); Peter James Aldworth, Cambridge (GB)

(73) Assignee: ARM Limited, Cambridge (GB)

( * ) Notice: Subject to any disclaimer, the term of this patent is extended or adjusted under 35 U.S.C. 154(b) by 735 days.

(21) Appl. No.: 11/785,140

(22) Filed: Apr. 16, 2007

(65) Prior Publication Data

US 2008/0256303 A1 Oct. 16, 2008

(51) Int. Cl.
*G06F 13/00* (2006.01)

(52) U.S. Cl. .................. 711/129; 711/133; 711/167; 711/173; 711/207

(58) Field of Classification Search .......... 711/133, 711/167, 173, 207, 129
See application file for complete search history.

(56) References Cited

U.S. PATENT DOCUMENTS

| 5,752,275 | A * | 5/1998 | Hammond | 711/207 |
| 6,349,364 | B1 * | 2/2002 | Kai et al. | 711/133 |
| 2005/0240745 | A1 * | 10/2005 | Iyer et al. | 711/167 |
| 2007/0106871 | A1 * | 5/2007 | O'Connor | 711/173 |

OTHER PUBLICATIONS

Tang et al., *Cache with Adaptive Fetch Size*, Technical Report ICS-00-16, Apr. 22, 2000, Department of Information and Computer Science, University of California, Irvine, 21 pages.
Tang et al, *Adaptive Line Size Cache*, Technical Report #-99-56, Nov. 1999, Department of Information and Computer Science, University of California, Irvine, 56 pages.

* cited by examiner

*Primary Examiner*—Sanjiv Shah
*Assistant Examiner*—Yong Choe
(74) *Attorney, Agent, or Firm*—Nixon & Vanderhye P.C.

(57) ABSTRACT

A data processor includes a cache memory having a plurality of cache rows each row storing a cache line of data values, a memory management unit responsive to a page table entry to control access to a corresponding group of memory addresses forming a memory page, and a cache controller coupled to said cache memory and responsive to a cache miss to trigger a line fill operation to store data values into a cache row. The cache controller is responsive to a cache line size specifier associated with at least one page table entry to vary the number of data values within a cache line fetched in a line fill operation in dependence upon said cache line size specifier. Controlling cache line size on a page basis is more efficient than controlling cache line size on a cache row or virtual address basis.

21 Claims, 4 Drawing Sheets

CACHE MEMORY

BACKGROUND OF THE INVENTION

1. Field of the Invention

This invention relates to the field of cache memories. More particularly, this invention relates to cache memories supporting variable cache line sizes.

2. Description of the Prior Art

In a cache memory, the size of the cache lines has a substantial influence on processor performance, and on the power consumption of the processor, the cache and the memory system. A cache line size which is too small will result in multiple small burst transactions being submitted to the memory system rather than a single large burst transaction, resulting in additional power consumption through inefficient use of SDRAM memory and an increase in CPU stall cycles due to more non-sequential accesses. In contrast, a cache line size which is too large will result in power being wasted due to non-required data being pre-fetched from memory, and will reduce the number of cache lines in the cache memory for a given cache size, thereby increasing the occurrence of conflict misses. It will therefore be appreciated that an improvement in processor performance and a reduction in power consumption can be sought by selecting an optimal cache line size. An optimal cache line size will minimise the number of burst transactions, only fetch data that is required, and minimise conflict misses. It will be understood that the term optimal cache line size in this context refers to a cache line size which is considered to provide a good compromise between the various requirements rather than any absolute standard.

However, studies have shown ("Adapting Cache Line Size to Application Behaviour", Alexander Veidenbaum et al.) that no single optimal cache line size caters for all applications. An optimal cache line size depends upon the content (instructions or data), the task, and the memory segment. The optimal cache line size can change over time.

Two main cache line size optimisation schemes are currently known, these being static optimisation and dynamic optimisation. Static optimisation examines the program code and/or data to be supported and selects the most appropriate cache line size, which will be a compromise for all the code executed. Static optimisation cannot be effectively used where the software to be executed is not known in advance.

Dynamic optimisation schemes adjust the cache line size at run time. A number of dynamic schemes are possible. For instance, in one scheme, the cache is divided into a number of small physical cache lines. These cache lines can be grouped together to generate a larger virtual cache line. The current virtual line lengths are stored in a lower level of the memory hierarchy and are used to select the length of a line fill on a cache miss. When a line is in the cache, usage information, including current virtual line size, adjacent bit and usage counter, is kept with each line. During the time when a line is resident in the cache, the presence of an adjacent line is monitored by hardware. When a line is evicted from the cache, this information is used to recalculate the optimum line size, and this is stored back to a lower level of the memory hierarchy.

In an alternative scheme, a large cache line is provided, but only part of the cache line is used depending on the result of a prediction. In particular, a predictor is used to predict the line length which will be required for a line fill. This scheme reduces the efficiency of the cache by reducing the number of available lines. Another scheme uses a compiler to specify how much data to fetch on a cache miss. This requires either an additional instruction or for the instructions to be extended. This scheme reduces code density, and isn't updated automatically. In general, the dynamic schemes are power hungry because predictors have to be used on each cache eviction, and consume a large amount of hardware. These schemes may also cause additional latency to cache accesses, and may lose predictor information as a result of task switches.

SUMMARY OF THE INVENTION

Viewed from one aspect, the present invention provides an apparatus for processing data comprising:

a cache memory having a plurality of cache rows each operable to store a cache line of data values;

a memory partitioning unit which partitions memory into a plurality of regions of memory;

a cache controller coupled to said cache memory and responsive to a cache miss to trigger a line fill operation to store data values into a cache row; wherein said cache controller is responsive to a cache line size specifier associated with at least one region of memory to vary a number of data values within a cache line fetched in a line fill operation in dependence upon said cache line size specifier.

Accordingly, by associating cache line size specifiers with page table entries, the number of data values to be stored in a line fill operation can be controlled on a memory page basis. Data values within the same page of memory are likely to be subject to similar types of access behaviour in the cache. In particular, accesses to one page of memory may be predominantly conducted as part of relatively long bursts of data, in which case a long cache line size would be advantageous, whereas accesses to another page of memory may be predominantly conducted by reading individual words of data in multiple short accesses. Specifying cache line size on a page basis therefore provides an appropriate level of granularity to enable program behaviour to be taken into account, and is more efficient, in terms of computation and storage, than controlling cache line size on a cache row or virtual address basis.

The memory partitioning unit could take a variety of different forms, such as, for example, a memory management unit.

It will be appreciated that embodiments of the present invention can be applied to direct-mapped, set associative or fully associative cache memories.

The cache line size specifiers may be conveniently stored in a transaction look-aside buffer (TLB), which stores page table entries for providing memory access functions such as virtual to physical address mapping and access rights. By storing the cache line size specifiers in the TLB, rapid access to the cache line size specifiers can be provided.

While the cache line size specifiers may be provided separately from the associated page table entries, either in the TLB or otherwise, the cache line size specifiers may also be stored within the respective associated page table entries. Furthermore, while the cache line size specifiers may only be provided within page table entries stored within the TLB, the cache line size specifiers may also be provided within a page table which is stored within a main memory. In this case, cache line size information for each page of memory is preserved even when page table entries are evicted from the TLB.

In one example, the cache line size specifiers are determined in advance of run time by analysing program code to be executed with the resulting line size calculated on a page-by-page basis. This is appropriate where the program code which is to be executed on the apparatus is known in advance. In another example, the cache line size specifiers are determined dynamically using a cache monitor. The cache monitor serves to monitor accesses to the cache memory during the execution of program code, and to determine a value for the cache line size specifiers in dependence on the monitored accesses. In this way, suitable values for the cache line size specifiers can be evaluated and set differently for different types of program code. These techniques could also be used in combination.

The present technique functions synergistically with a cache structure in which at least one of the cache rows is configured by the cache line size specifier to form a variable number of portions each storing one or more of the data values. In this case, each portion of the at least one cache row has an associated cache tag for storing address information identifying a memory location corresponding to the one or more data values stored in that portion of the at least one cache row. Accordingly, different cache line lengths can be constructed by combining together multiple portions of the cache row, with the number of portions to be combined being dependent on the value of the cache line size specifier.

Dynamic determination of cache line size specifiers can also be conducted in respect of this cache structure. In one example implementation of a cache monitor for this cache arrangement, the cache monitor is responsive to an access request which results in a cache miss on one of the portions of a cache row and a cache hit on another of the portions of the cache row to modify a counter value in a first direction, and responsive to an eviction of a cache line having portions which have not been accessed to modify the counter value in a second direction. The cache monitor is responsive to the counter value to update the cache line size specifier. The first direction can be an increase in the counter value and the second direction a decrease in the counter value, or vice versa. In this way, if the number of cache hit and miss combinations in respect of a particular page of memory is greater than the number of cache evictions with unused cache lines in respect of that page of memory, the cache line size specifier associated with that page can be modified to specify a greater line size, whereas if the number of cache evictions with unused cache lines for the page is greater than the number of cache hit and miss combinations for the page, the cache line size specifier associated with the page can be modified to specify a smaller line size. The cache monitor hardware could operate continuously or periodically to reduce power consumption.

In at least preferred embodiments at least one cache row is configured by said cache line size specifier to form a variable number of portions each storing one or more data values; and each portion of said at least one cache row has an associated cache tag for storing address information identifying a memory location corresponding to said one or more data values stored in that portion of said at least one cache row.

This cache structure provides improved flexibility because the portions of each cache line can be either individually accessed or collectively accessed as a longer virtual cache line. For instance, in performing a cache eviction, victim lines can be selected from any strip in any way of the cache, and so portions of large virtual lines may be evicted by small line fills. Additionally, this cache structure can deal with a partial cache miss, in which some portions of a long virtual line are hit (in the same way) but other portions of the virtual line are missed, by fetching only the missing lines in a line fill operation. The resulting reduction in the number of fetches required from the main memory to the cache memory results in an improvement in efficiency and a reduction in consumed power. The variable number of portions may be $2^N$, where N is one or more.

Each of the portions may have an associated unused indicator which indicates whether the one or more data values stored in that portion have been accessed. In this way, it is possible to keep track of whether portions of cache rows are accessed prior to being evicted from the cache, and to modify the cache line size for future line fills in the event that portions of the cache row remain unused.

Viewed from another aspect, the present invention provides an apparatus for processing data comprising:

means for storing a cache line of data values into each of a plurality of cache rows;

means for partitioning a memory into a plurality of regions of memory;

means for triggering a line fill operation to store data values into a cache row in response to a cache miss; wherein said means for controlling access is responsive to a cache line size specifier associated with at least one region of memory to vary a number of data values within a cache line fetched in a line fill operation in dependence upon said cache line size specifier.

Viewed from another aspect, the present invention provides a method of processing data comprising the steps of:

triggering, in response to a cache miss, a line fill operation to store a cache line of data values into a cache row of a cache memory; and controlling a number of data values within a cache line fetched in said line fill operation in dependence upon a cache line size specifier associated with at least one region of memory which controls access to said region of memory addresses.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
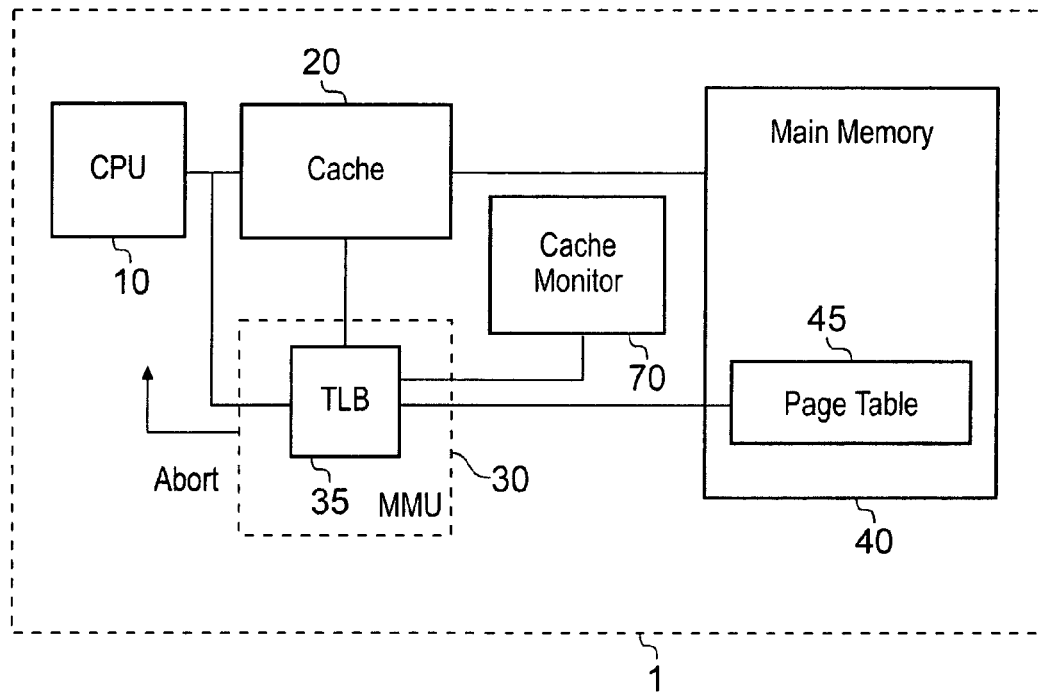
FIG. 1 schematically illustrates a data processing apparatus according to an example embodiment.

In FIG. 1, a data processing apparatus 1 is illustrated and includes a central processing unit (CPU) 10, a cache memory 20, a memory management unit (MMU) 30, and a main memory 40. The cache memory 20 is arranged to store a copy of a subset of the data present in the main memory 40. Accesses to data stored in the cache memory 20 can be conducted much faster than accesses to data stored only in the main memory 30, leading to improvements in performance. The MMU 30 serves to assign properties to main memory accesses on a memory region basis and includes a transaction look-aside buffer (TLB) 35 which stores page table entries providing virtual to physical address mapping and access control permissions. In particular, while the cache memory 20 may be addressable using virtual addresses, the main memory 40 can only be addressed using physical addresses. Accordingly, virtual to physical address mapping is required to access data within the main memory 40 if it is not found to be present in the cache memory 20. It should be appreciated that the TAGs within the cache memory may instead correspond with physical addresses, in which case the page table should be consulted to translate the virtual address to a physical address before the TAG can be matched. In the following a virtually tagged cache is described but the present techniques are equally suited to a physically tagged cache. The page table entries stored in the TLB 35 comprise a subset of page table entries which form a page table 45 stored in the main memory 40. In effect, the TLB 35 operates as a cache in respect of page table information, thereby providing rapid hardware access to a portion of the page table information which is stored in the page table 45. The data processing apparatus 1 also includes a cache monitor 70 which monitors accesses to the cache memory 20 and dynamically updates a cache line size specifier stored in the TLB 35 in dependence on cache access behaviour.

In operation, the CPU 10 issues a virtual address to the cache memory 20 and the TLB 35. The virtual address indicates a location within virtual memory to which the CPU 10 requires access. As mentioned above, the cache memory 20 is accessible using virtual addresses, and so virtual to physical address conversion is not required prior to determining whether requested data is present with the cache memory 20, nor is it required in order to read the requested data from the cache memory 20 if it is found to be present within the cache memory 20. However, access control permissions for the requested data may need to be determined from the page table entries, in which case the MMU 30 will refer to the TLB 35 to determine whether the page table entry corresponding to the virtual address is present within the TLB 35, and if so, read out and act upon the access control permissions defined in the page table entry. For instance, if access to the requested data is prohibited, an abort signal may be transmitted to the CPU 10 to discontinue the memory access, whereas if access to the requested data is allowed, the memory access will be allowed to proceed.

In the case of a cache miss, where requested data is found not to be present within the cache memory 20, it becomes necessary to obtain the requested data from the main memory 40. In particular, the requested data will be copied from the main memory 40 to the cache memory 20, where it can be accessed by the CPU 10. In order to obtain the appropriate physical address to access the requested data in the main memory 40, the MMU 30 will determine whether the TLB 35 includes the page table entry corresponding to the virtual address issued by the CPU 10, and if so will use the page table entry to determine the physical address corresponding to the virtual address. If the appropriate page table entry is not present in the TLB 35, the MMU 30 will obtain the appropriate page table entry from the page table 45 stored within the main memory 40, store the obtained page table entry into the TLB 35, and use the page table entry to determine the physical address corresponding to the virtual address. The physical address is then transmitted from the TLB 35 to the cache, and can be used by the cache memory 20 to obtain the requested data from the main memory 40.

The process of obtaining data from the main memory 40 and storing it in the cache memory 20 is conducted by way of a line fill. In particular, a cache memory will have a plurality of cache rows, each of which can store a number of data values taken from a main memory. Traditionally, a line fill in respect of a cache row can only be conducted in respect of a whole cache row, however, in the present technique a variable number of data values can be fetched from the main memory 40 and stored into a row of the cache memory 20. The variable number of data values which are fetched in a line fill is dependent on a cache line size specifier which is stored in association with the page table entry which corresponds to the data being fetched, and which is provided to the cache memory 20 by the TLB 35 whenever a cache miss occurs. The cache monitor 70 is able to modify the cache line size specifier in the page table entry as a result of monitored accesses to the cache memory 20.

Figure 2:
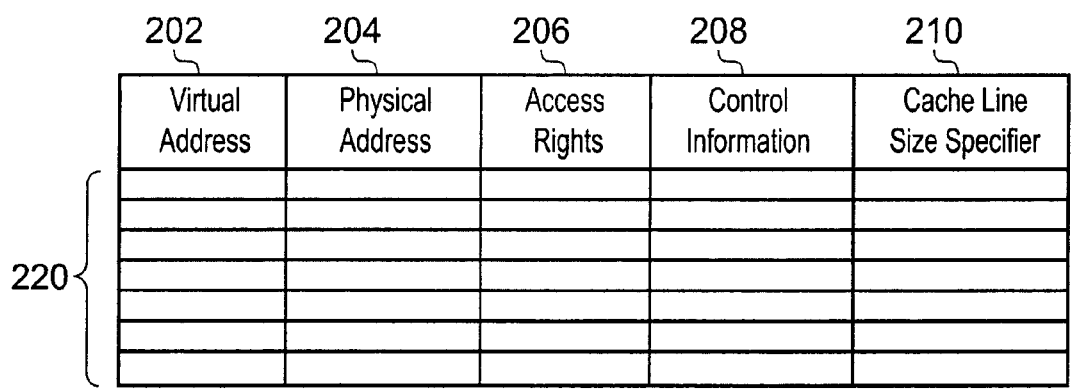
FIG. 2 schematically illustrates a page table structure according to an example embodiment.

Referring to FIG. 2, an example page table structure is schematically illustrated. The table includes a virtual address column 202, a physical address column 204, an access rights information column 206, a control information column 208 and a cache line size specifier column 210. The table comprises a plurality of rows 220, each of which constitutes a page table entry. Each page table entry corresponds to a chunk (referred to as a page) of virtual memory, which in turn corresponds to a chunk (referred to as a frame) of physical memory. It will therefore be appreciated that a page will correspond to a plurality of virtual addresses and a frame will correspond to a plurality of physical addresses. All of the virtual addresses within a page will have the n most significant bits in common, with the remaining bits varying between virtual addresses within the page. The same principle applies with the physical addresses within the corresponding frame. Accordingly, the virtual address column stores the virtual address bits which are common to all virtual addresses in that page, and likewise the physical address column 204 stores the physical address bits which are common to all physical addresses in the frame corresponding to that page. The remaining bits of the virtual and physical addresses do not require mapping because they constitute an offset value which is common to both the virtual and physical addresses. Such page table structures will be familiar to those in this technical field and will not be described further herein.

The access rights information column 206 includes information such as whether the page is privileged, read only and/or cacheable. The control information column 208 includes control bits such as valid and dirty bits, which control how the page of memory corresponding to the page table entry is handled. The cache line size specifier column 210 stores, in respect of each page table entry, an indication of the size of a cache line to be fetched into a row of the cache memory 20 when a line fill operation is conducted in respect of a memory address within the page corresponding to the page table entry. Accordingly, the cache line size to be fetched is controlled on a page (and frame) basis.

In some system architectures, virtual addressing may not be provided and therefore virtual to physical address mapping will not be required. In this case, the page table will only include a single address column, which stores a physical address issued by a CPU which specifies a physical location in a main memory. In some embodiments, (e.g. systems which don't require address translation), page tables are not required. In this case line size per address region should be stored in some other way, e.g. in a memory regions unit.

Figure 3:
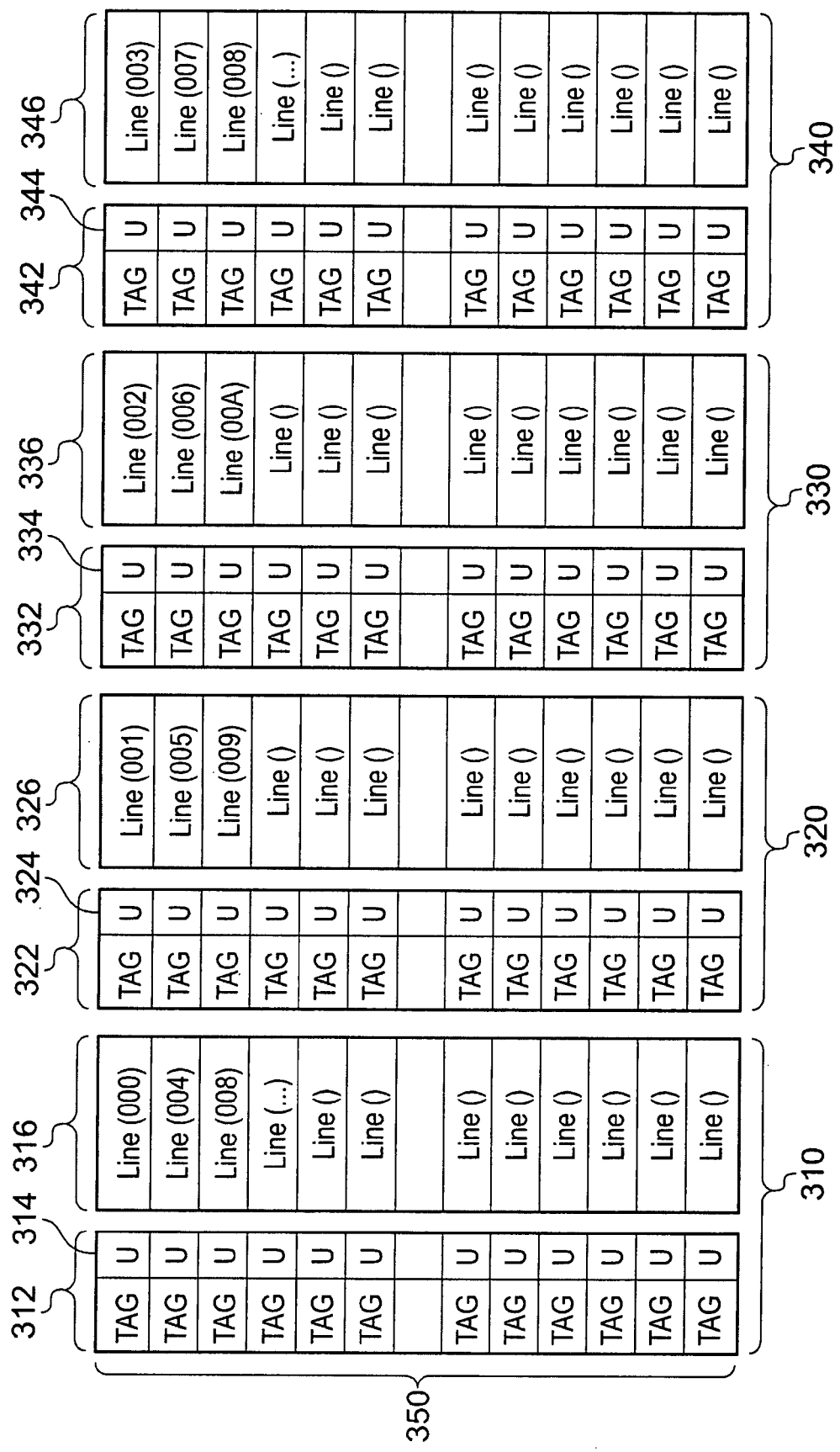
FIG. 3 schematically illustrates a cache structure according to an example embodiment.

Referring to FIG. 3, a cache structure with variable size cache rows is schematically illustrated. Each way of the cache structure includes a plurality of cache rows 350 and is divided into four strips, these being a first strip 310, a second strip 320, a third strip 330 and a fourth strip 340. It will be appreciated that, for the sake of clarity, in FIG. 3 only a single way of the cache memory is shown. Each cache row of data values can be constructed using a respective line from either one, two, three or four of the strips. In this way, a variable cache row size can be defined and utilised in a line fill operation by grouping together lines in the same row of adjacent strips. The number of strips in each cache way structure therefore determines the maximum line length. Each strip of the cache includes a series of associated cache tags, and each cache tag include an associated unused bit. In particular, the first strip 310 comprises a series of tags 312, a series of unused bits 314 and a series of lines of data values 316. Correspondingly, the second strip 320 comprises a series of tags 322, a series of unused bits 324 and a series of lines of data values 326, the third strip 330 comprises a series of tags 332, a series of unused bits 334 and a series of lines of data values 336, and the fourth strip 340 comprises a series of tags 342, a series of unused bits 344 and a series of lines of data values 346. The tags 312, 322, 332, 342 enable a specific portion of a cache row to be manipulated in isolation from other portions of the cache row. For instance, line fills can be performed in respect of only a portion of a cache row, overwriting only that portion and leaving the remaining portions intact and usable by the CPU 10. Additionally, in the case of a partial cache miss, only the missing lines need be fetched from main memory in the resulting line fill operation. The unused bit associated with a particular portion indicates whether the data values stored in that portion have been accessed by the CPU 10 since being fetched into the cache. The purpose of the unused flag will be explained later with reference to FIG. 6.

Figure 4:
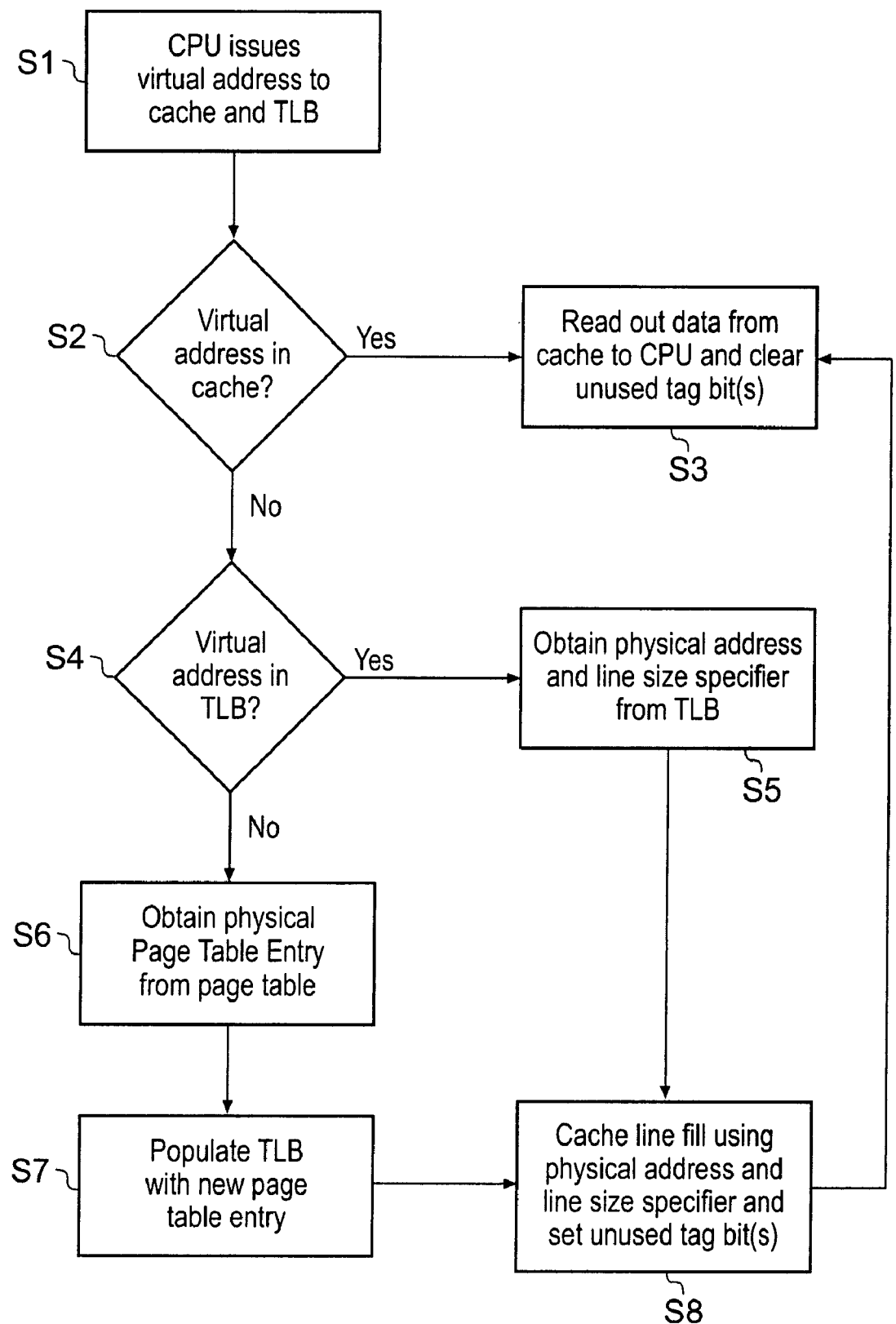
FIG. 4 is a schematic flow diagram illustrating a method of controlling a line fill operation in accordance with an example embodiment.

An example method of operating the cache memory 20 described in FIGS. 1 and 3 in accordance with a cache line size specifier is described with reference to FIG. 4. At a step S1, the CPU 10 issues a virtual address to the cache memory 20 and the TLB 35. At a step S2, it is determined whether the cache memory 20 is currently storing data values relating to the virtual address. This is achieved by comparing a portion of the virtual address with the potentially matching cache tags provided in the cache memory 20. If a match occurs, the requested data is determined to be currently held in the cache memory 20, and then at a step S3 the requested data is read out from the cache memory 20 to the CPU 10 and the "unused" tag bit(s) is/are cleared corresponding to the strip that is read (e.g. 314 is cleared if 316 is read). However, if a match does not occur at the step S2, then it becomes necessary to obtain the requested data from the main memory 40.

In order to obtain the physical address required to access the requested data in the main memory 40, at a step S4 it is determined whether the page table entry corresponding to the virtual address issued by the CPU 10 is currently present in the TLB 35. If the appropriate page table entry is present in the TLB 35, then at a step S5 the physical address corresponding to the virtual address issued by the CPU 10 is determined from the page table entry, and a cache line size specifier stored in association with the page table entry is obtained. Then, at a step S8, a cache line fill and set unused tag bits operation is performed to transfer the data values stored in the main memory 40 at the determined physical address into an appropriate cache row of the cache memory 20. In performing the line fill, the number of data values fetched from the main memory 40 into the cache memory 20 is selected in dependence on the value of the cache line size specifier. Specifically, referring to the cache memory structure illustrated in FIG. 3, the number of portions of a cache row which will be filled with data values fetched from the main memory will be selected in dependence on the value of the cache line size specifier and the low order address bits of the address. Then, once the line fill operation has been completed, the process returns to the step S3, where the newly cached data will be read out from the cache memory 20 to the CPU 10 and the "unused" tag bit(s) is/are cleared corresponding to the strip that is read (e.g. 314 is cleared if 316 is read).

However, if at the step S4 it is determined that the page table entry corresponding to the virtual address issued by the CPU 10 is not currently present in the TLB 35, then at a step S6 the MMU 30 accesses the page table stored in the main memory 40, and obtains the page table entry corresponding to the virtual address issued by the CPU 10 from the page table. In this way, the physical address corresponding to the virtual address and the cache line size specifier stored in association with the appropriate page table entry can be obtained. Then, at a step S7, the TLB 35 is populated with the newly obtained page table entry and, at the step S8, a cache line fill and set unused tag bits operation is performed to transfer the data values stored in the main memory 40 at the determined physical address into an appropriate cache row of the cache memory 20, with the number of portions to be filled being selected in dependence on the obtained cache line size specifier S8 also sets the corresponding "unused" tag bits for each of the strips loaded by the line fill. Then, once the line fill operation has been completed, the process returns to the step S3, where the newly cached data will be read out from the cache memory 20 to the CPU 10 and the "unused" tag bit(s) is/are cleared corresponding to the strip that is read (e.g. 314 is cleared if 316 is read).

It will therefore be appreciated that the cache line size selection method can be neatly integrated with a cache access and line fill procedure.

Figure 5:
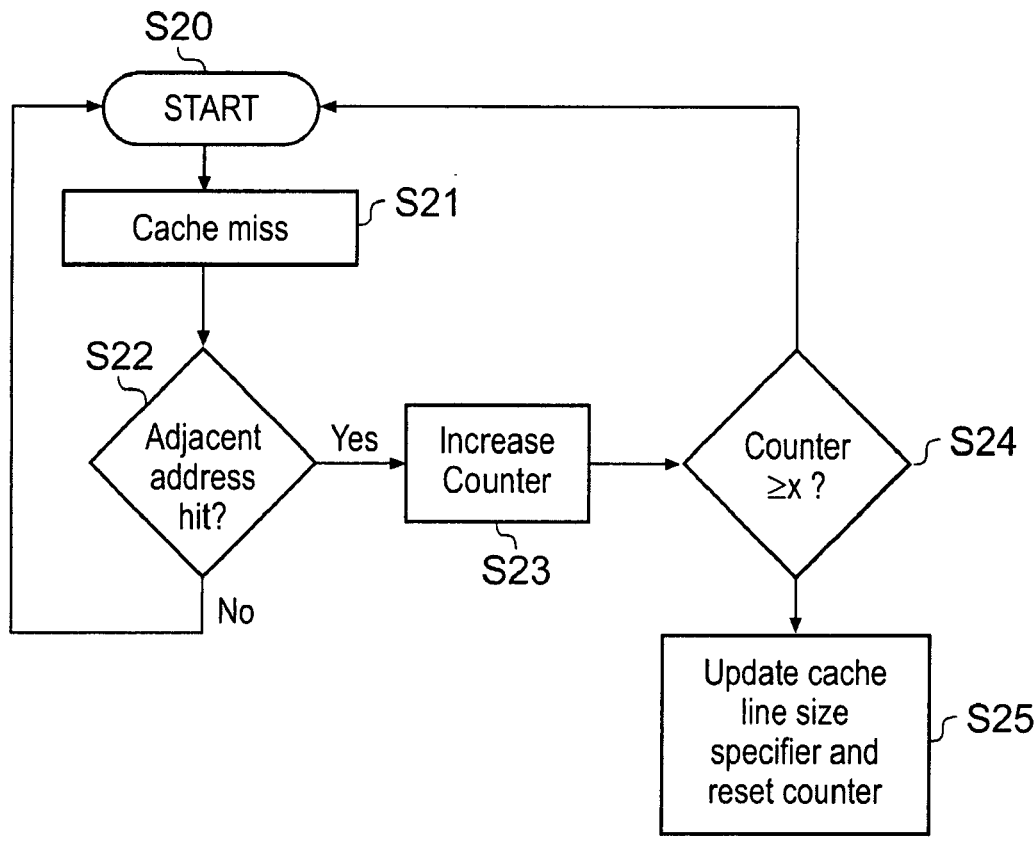
FIG. 5 is a schematic flow diagram illustrating a method of updating a cache line size in dependence on the occurrence of particular combinations of cache hit and cache miss.
Figure 6:
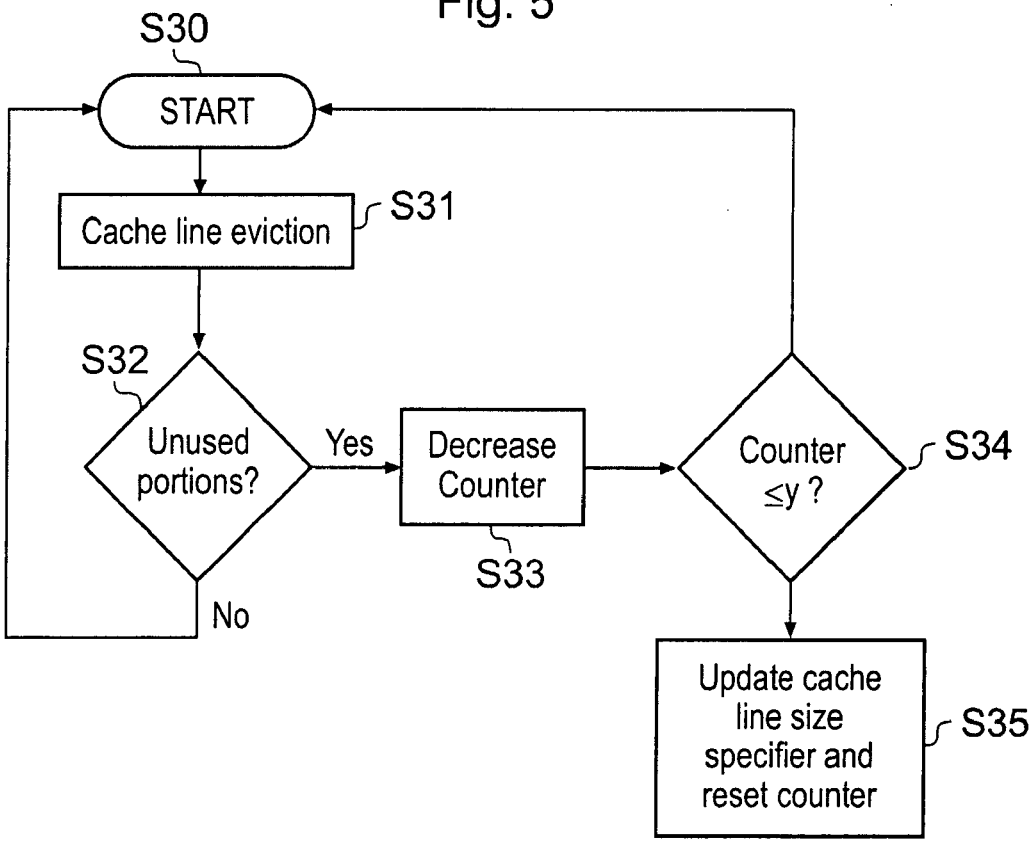
FIG. 6 is a schematic flow diagram illustrating a method of updating a cache line size in dependence on a cache eviction of a cache line having unused portions.

FIGS. 5 and 6 schematically illustrate an example method of dynamically updating the cache line size specifiers using the cache monitor 70 illustrated in FIG. 1. In particular, FIG. 5 schematically illustrates a method of increasing the value of the cache line size specifier, whereas FIG. 6 schematically illustrates a method of decreasing the value of the cache line size specifier.

Referring to FIG. 5, the process starts at a step S20. When the cache monitor 70 detects the occurrence of a cache miss at a step S21 due to requested data not being present in the cache memory 20, the cache monitor 70 determines whether a cache hit has occurred on an adjacent portion of the same cache row (in any way of the cache memory 20). If no cache hit has occurred on an adjacent portion, then processing returns to the step S20 where the cache monitor 70 waits for a further cache miss. However, if an adjacent cache hit is detected, then at a step S23 the value of a counter associated with the page table entry corresponding to the cache hit is increased in the cache monitor 70. Then, at a step S24, the cache monitor 70 determines whether the value of the counter has reached or exceeded a predetermined value x, and if so updates the cache line size specifier associated with the virtual address in respect of which the cache miss occurred to specify a greater cache line size. At this time, the cache monitor also resets the value of the counter to an initial value. However, if at the step S34 the value of the counter has not reached or exceeded the predetermined value x, then processing returns to the step S20 where the cache monitor 70 waits for another cache miss. In this way, if a row of the cache is subject to both a cache hit and a cache miss in respect of a single cache row access, a counter will be increased, and a related cache line size specifier may be updated to specify a greater cache line size. This is because the occurrence of a cache miss on one portion of a row and a cache hit on an adjacent portion signifies that the cache line which had been fetched into the cache was too small. Due to the fact that data values present in the same page of memory are likely to be subject to the same kinds of accesses, it can be assumed that by increasing the cache line size to be fetched in respect of future accesses to the page will result in improved performance. The counter value associated with a page table entry is retained and updated as appropriate at least until the associated page table entry has been evicted from the TLB 35.

Referring to FIG. 6, the process starts at a step S30. When the cache monitor 70 detects a cache line eviction at a step S31, it determines, at a step S32, whether the evicted line include portions which are valid but unused (e.g. 314, 324, 332, 344), as indicated by the unused flag illustrated in FIG. 3. If a portion is marked as unused, this means that it has not been accessed since being fetched into the cache memory 20, and that the process of fetching it into the cache memory 20 was therefore wasteful. If the evicted line does not include any unused portions, then processing returns to the step S30, where the cache monitor 70 awaits another cache line eviction. If the evicted line does include one or more unused portions, then at a step S33 the value of a counter associated with the page table entry corresponding to the evicted line is decreased, and at a step S34 it is determined whether the value of the counter has dropped to or below a predetermined value y. Optionally, the counter may be decreased by the number of unused portions which have been detected. If at the step S34 it is determined that the value of the counter has dropped below the value y, then the cache line size specifier corresponding to the virtual address of the cache line being evicted is updated at a step S35 to specify a smaller cache line size. At this time, the value of the counter is reset to an initial value. Due to the fact that data values present in the same page of memory are likely to be subject to the same kinds of accesses, it can be assumed that by decreasing the cache line size to be fetched in respect of future accesses to the page will result in improved performance, because excess portions of cache rows will not be populated. The counter value associated with a page table entry is retained and updated as appropriate at least until the associated page table entry has been evicted from the TLB 35.

A number of variations to the method illustrated in FIGS. 5 and 6 are possible. For instance, it would be possible to only update the cache line size specifiers periodically, in order to conserve power, albeit at the cost of a slight reduction in cache efficiency due to a less responsive updating procedure. Also, the algorithms represented by FIGS. 5 and 6 could in some embodiments be modified (e.g. by introducing a hysteresis property) to prevent the value of the cache line size specifier fluctuating between a single line (one portion) and a double line (two portions), which may occur due to the fact that a single line will sometimes result in adjacent line hits (in accordance with FIG. 5) but will never result in unused portions being detected (in accordance with FIG. 6), thereby preventing a balance from being achieved between the processes of FIG. 5 and FIG. 6.

FIGS. 1 to 6 describe a data processing system having a cache monitor and a cache memory structure which includes an unused bit which assists in the dynamic determination of suitable cache line lengths. However, it is also possible to provide static determination of suitable cache line lengths by analysing program code to be executed in advance. In this case, a cache monitor will not be required, and the cache structure will not require unused bits to be present in the cache tags. This simplifies the data processing system, but at the cost of flexibility. The statically determined cache line size information can either be programmed, directly into the appropriate page table entries, or alternatively provided to the operating system which will in turn program the page table entries accordingly.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:
1. Apparatus for processing data comprising:
    a cache memory having a plurality of cache rows each of said cache rows configured to store a cache line of data values;
    a memory partitioning unit which partitions memory into a plurality of regions of memory;
    a cache controller, coupled to said cache memory and responsive to a cache miss, configured to trigger a line fill operation to store data values into said cache rows, wherein said cache controller is responsive to a cache line size specifier associated with at least one region of memory to vary a number of data values within a cache line fetched in a line fill operation in dependence upon said cache line size specifier, wherein at least one of said cache rows is configured by said cache line size specifier to form a variable number of portions, each of said portions storing one or more of said data values, wherein each of said portions of said at least one of said cache rows has an associated cache tag for storing address information identifying a memory location corresponding to said one or more data values stored in a corresponding portion of said at least one of said cache rows.
2. Apparatus as claimed in claim 1, wherein said memory partitioning unit is a memory management unit responsive to an access control entry to control access to a corresponding group of memory addresses forming one of said plurality of regions of memory.
3. Apparatus as claimed in claim 2, wherein said access control entry is a page table entry and said region of memory is a memory page.
4. Apparatus for processing data as claimed in claim 3, wherein said cache line size specifiers are stored within respective associated page table entries.
5. Apparatus for processing data as claimed in claim 3, wherein said page table entries are stored within a page table provided in main memory.
6. Apparatus for processing data as claimed in claim 1, comprising:
    a transaction look-aside buffer for storing said cache line size specifiers.
7. Apparatus for processing data as claimed in claim 1, wherein said cache line size specifiers are determined in advance of run time by analyzing program code to be executed by the apparatus for processing data.
8. Apparatus for processing data as claimed in claim 1, comprising a cache monitor operable:
    to monitor accesses to said cache memory during execution of program code on said apparatus for processing data; and
    to determine a value for one or more of said cache line size specifiers in dependence on said monitored accesses.
9. Apparatus for processing data as claimed in claim 1, comprising:
    a cache monitor, responsive to an access request which results in a cache miss on one of said portions and a cache hit on another of said portions to modify a counter value in a first direction, and responsive to an eviction of a cache line having portions which have not been accessed to modify said counter value in a second direction; wherein said cache monitor is responsive to said counter value to update said cache line size specifier.

10. Apparatus for processing data as claimed in claim 1, wherein:
at least one cache row is configured by said cache line size specifier to form a variable number of portions each storing one or more data values; and
each portion of said at least one cache row has an associated cache tag for storing address information identifying a memory location corresponding to said one or more data values stored in that portion of said at least one cache row.

11. A cache memory as claimed in claim 10, wherein said variable number of portions is $2^N$, where N is an integer of one or more.

12. A cache memory as claimed in claim 10, wherein each of said portions has an associated unused indicator which indicates whether the one or more data values stored in that portion have been accessed.

13. Apparatus for processing data comprising:
means for storing a cache line of data values into at least one of a plurality of cache rows;
means for partitioning a memory into a plurality of regions of memory;
means for triggering a line fill operation to store data values into at least one of said cache rows in response to a cache miss; wherein
said means for controlling access is responsive to a cache line size specifier associated with at least one region of memory to vary a number of data values within a cache line fetched in a line fill operation in dependence upon said cache line size specifier, wherein said at least one of said cache rows is configured by said cache line size specifier to form a variable number of portions, each of said portions storing one or more of said data values, wherein each of said portions of said at least one of said cache rows has an associated cache tag for storing address information identifying a memory location corresponding to said one or more data values stored in a corresponding portion of said at least one of said cache rows.

14. A method of processing data comprising the steps of:
triggering, in response to a cache miss, a line fill operation to store a cache line of data values into at least one of a plurality of cache rows of a cache memory; and
controlling a number of data values within a cache line fetched in said line fill operation in dependence upon a cache line size specifier associated with at least one region of memory which controls access to said region of memory addresses, wherein said at least one of said cache rows is configured by said cache line size specifier to form a variable number of portions, each of said portions storing one or more of said data values, wherein each of said portions of said at least one of said cache rows has an associated cache tag for storing address information identifying a memory location corresponding to said one or more data values stored in a corresponding portion of said at least one of said cache rows.

15. A method as claimed in claim 14, wherein said cache line specifier is part of a page table entry and said region of memory is a memory page.

16. A method of processing data as claimed in claim 15, wherein said cache line size specifiers are stored within respective associated page table entries.

17. A method of processing data as claimed in claim 15, wherein said page table entries are stored within a page table provided in main memory.

18. A method of processing data as claimed in claim 14, comprising a step of storing said cache line size specifiers in a transaction look-aside buffer.

19. A method of processing data as claimed in claim 14, wherein said cache line size specifiers are determined in advance of run time by analyzing program code to be executed.

20. A method of processing data as claimed in claim 14, comprising the steps of:
monitoring accesses to said cache memory during execution of program code; and
determining a value for one or more of said cache line size specifiers in dependence on said monitored accesses.

21. A method of processing data as claimed in claim 14, comprising the steps of:
modifying a counter value in a first direction in response to an access request which results in a cache miss on one of said portions and a cache hit on another of said portions,
modifying said counter value in a second direction in response to an eviction of a cache line having portions which have not been accessed; and
updating said cache line size specifier in response to said counter value.

* * * * *